July 10, 1934.  K. W. STROHOFER  1,966,191
EDGED CARDBOARD REEL
Filed Jan. 7, 1933
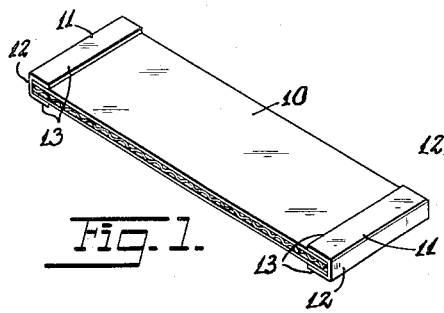
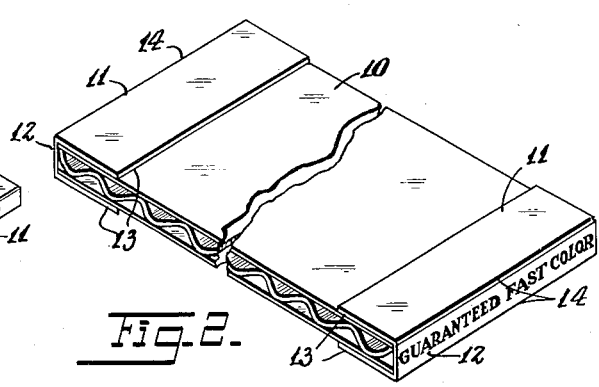
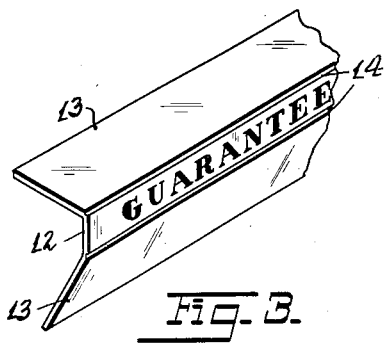
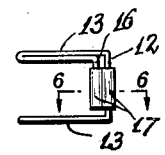
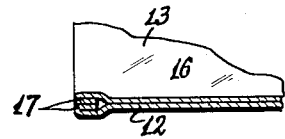
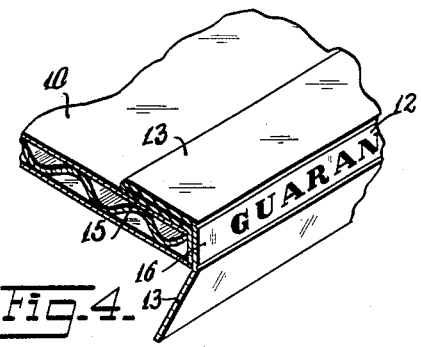
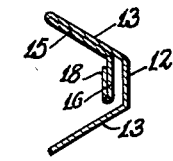
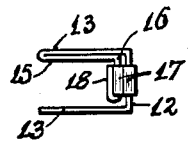
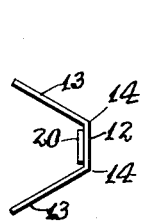
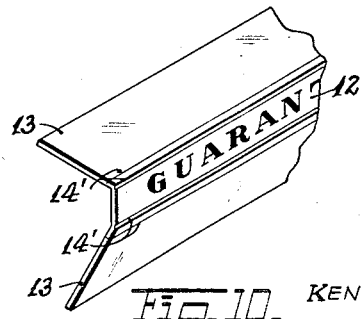
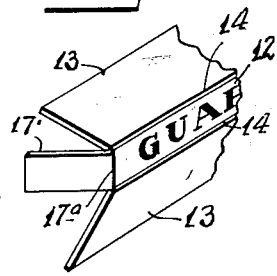
INVENTOR
KENNETH W. STROHOFER
BY
ATTORNEY Patented July 10, 1934

1,966,191

UNITED STATES PATENT OFFICE 1,966,191

EDGED CARDBOARD REEL

Kenneth W. Strohofer, Brooklyn, N. Y., assignor, by direct and mesne assignments, of one-third to Howard J. Sands, one-third to Allan Miller, both of Brooklyn, N. Y., and one-third to Louis Cohen, New York, N. Y.

Application January 7, 1933, Serial No. 650,671

7 Claims. (Cl. 206—50)

This invention relates to new and useful improvements in an edged cardboard reel.

The invention has for an object the construction of an article as mentioned which is characterized by the provision of inexpensive cardboard or other similar material edged with attractive looking end strips so as to give the effect that the entire piece is of attractive material when piece material is engaged upon the reel.

Still further the invention proposes an arrangement whereby score lines, perforations or the like upon the end strips adapt them for easy folding and engagement in place upon the edges of the cardboard.

Still further the invention proposes an arrangement whereby each end strip is provided with an end portion connected with top and bottom sections for attachment upon the top and bottom sides of the cardboard.

When the edges of the cardboard reel are gripped, as when the reel of piece goods is handled, there is the possibility that the end portions of the strips may be collapsed and produce an undesirable appearance. Therefore the invention also contemplates an arrangement for reinforcing these end portions against easy collapsing.

Still further the invention proposes the provision of passages immediately behind the end portions adapted for receiving a reinforcement strip capable of extending outwards the collapsed end portions to again place them into their original forms.

The invention still further proposes an arrangement whereby the strip may be easily inserted or removed from the passages mentioned in the previous paragraph.

Another one of the objects of this invention is the construction of an edged carboard reel which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a cardboard reel constructed according to this invention.

Fig. 2 is a fragmentary enlarged detailed view of Fig. 1.

Fig. 3 is a perspective view of one of the strips, per se.

Fig. 4 is a sectional view of one end of the reel constructed according to a modification of the invention.

Fig. 5 is an edge elevational view of the reel illustrated in Fig. 4.

Fig. 6 is a fragmentary horizontal sectional view taken on the line 6—6 of Fig. 5.

Fig. 7 is a transverse sectional view of a strip, for use upon the edge of a reel, constructed according to a variation of this invention.

Fig. 8 is an edge elevational view of the strip shown in Fig. 7.

Fig. 9 is another edge elevational view of another modified form of strip.

Fig. 10 is a fragmentary perspective view of another form of strip adapted for use upon the cardboard reel.

Fig. 11 is a similar view to Fig. 10, but showing a further modified form of the invention.

The edged cardboard reel according to this invention comprises a piece of cardboard 10 of the corrugated type, but may also be of chipboard, pulp board, etc. The ends of this piece of cardboard are provided with edging strips 11 secured in place. Each of these strips 11 is provided with an end portion 12, and top and bottom portions 13. Preferably the end strips should be manufactured flat and formed with parallel scoring lines 14 adapted for guiding the bending of the strips so as to form the end portion 12 and the top and bottom portions 13. Instead of scoring lines, perforations or any other method may be used to accomplish easy folding.

The portions 12 may be printed with desirable information such as indicated in Fig. 2 of the drawing. While the cardboard 10 has been shown of one piece and corrugated it may be plain and of several layers. The top and bottom portions 13 are pasted, stapled or in any other manner secured upon the ends of the cardboard. The scoring lines 14 serve to form the finished cardboard reel with straight edges at the top and bottom and a flat end portion 12 which gives the appearance of a substantial piece of material when piece goods is wound thereon. In Fig. 3 one of the strips has been illustrated in perspective view before its application upon the cardboard. The various parts will be recognized by the reference numerals.

In Figs. 4–6 inclusive a modification has been disclosed in which the end portion 12 of each of the strips is reinforced and adapted to be straightened out in the event of being bent in. More particularly, the strip is provided with another section 15 secured upon one of the portions of the strip, reference being had to the top or bottom portions 13, and is connected with an end section 16 assuming a position immediately adjacent the end portion 12 so as to reinforce the end portion.

The section 15 is secured to the portion 13 by glueing or the like, but the section 16 is free and unconnected from the section 12 so as to provide a passage therebetween. If the reel is gripped by the corner edges 14 the possibility of these edges collapsing under grip is materially reduced because of the reinforcement of the piece 16. The cardboard 10 is of the type which does not give much support to the edges 14. In the event that the edges 14 are collapsed accidently they may be straightened out by inserting a strip in the space between the portions 16 and 12. To facilitate the insertion of such a strip, inturned flaps 17 are connected upon the edges of the portions 12 and 16 as clearly illustrated in Figs. 5 and 6. Thus these inturned portions readily guide the insertion of a strip.

In Figs. 7 and 8 another variation of the invention has been disclosed which is substantially identical to the form described in Figs. 4, 5 and 6 but differs in the provision of another reinforcement portion 18 connected with an edge of the portion 16. More particularly the reinforcement portion 18 is produced by bending up the free edge of the portion 16 so as to form an extra layer disposed behind the portion 12. In other respects this form of the invention is identical to the previous form and the corresponding parts may be recognized by the same reference numerals.

In Fig. 9 another strip has been shown for engagement upon the edge of a cardboard reel and is shown to comprise an end portion 12 connected with top and bottom portions 13, and the provision of a reinforcement strip 20 permanently secured upon the inside face of the end portion 12. This reinforcement strip 20 serves the purpose of preventing the accidental collapsing of the scored edges 14 of the end portions 12.

In Fig. 10 another variation of strip has been shown for use upon a cardboard reel and comprises an end portion 12 connected with top and bottom portions 13 separated from each other by a plurality of closely spaced parallel scoring lines 14'. The object of producing a plurality of scoring lines 14' lies in the fact that when the strip is bent for engagement upon the cardboard of a reel the end portion 12 may be selected of the proper width for correctly engaging upon the cardboard since the portions 13 may be bent from a selection of scoring lines 14'.

In Fig. 11 a further variation of the strip has been shown in which an end strip 17' is adapted to cover the exposed end of the cardboard 10. This end strip is also scored, perforated at 17a or otherwise made adaptable for easy folding about the longitudinal edge of the cardboard.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In an edged cardboard reel, a strip formed with a pair of longitudinal parallel scoring lines dividing off a front end and top and bottom portions for attachment upon the ends of said cardboard piece and a continuation from one of said portions having a strip portion disposed behind said front end and forming a passage, and elements at the ends of the passage for keeping the ends open.

2. In an edged cardboard reel, a strip formed with a pair of longitudinal parallel scoring lines dividing off a front end and top and bottom portions for attachment upon the ends of said cardboard piece, and a continuation of said portions having a strip portion disposed behind said front end, said strip portion and front end being in intimate contact with each other for reinforcing each other and being separable for forming a passage for the insertion of a flat element for the purpose described.

3. In an edged cardboard reel, a strip formed with a pair of longitudinal parallel scoring lines dividing off a front end and top and bottom portions for attachment upon the ends of said cardboard piece, and a continuation from one of said portions having a strip portion disposed behind said front end, said strip portion and front end forming a passage, and the ends of said strip portion and front end being turned inwards.

4. An edged cardboard reel, comprising a piece of cardboard, edging strips on the ends thereof, comprising an end portion connected with top and bottom sections, another section secured upon one of said sections along its entire area, and another portion connected upon said section and arranged adjacent and in intimate contact with said end portion forming a passage therebetween, and elements in the ends of said passage for holding the ends slightly open.

5. An edged cardboard reel, comprising a piece of cardboard, edging strips on the ends thereof, comprising an end portion connected with top and bottom sections, another section secured upon one of said sections along its entire area, and another portion connected upon said section and arranged adjacent said end portion forming a passage therebetween, and inturned flaps upon the ends of said end portion and adjacent end portion to facilitate the insertion of a strip within said passage.

6. An edged cardboard reel, comprising a piece of cardboard, edging strips on the ends thereof, comprising an end portion connected with top and bottom sections, another section secured upon one of said sections along its entire area, and another portion connected upon said section and arranged adjacent said end portion forming a passage therebetween, and inturned flaps upon the ends of said end portion and adjacent end portion to facilitate the insertion of a strip within said passage, said inner end portion being further reinforced by another section extended adjacent it.

7. An edged cardboard reel, comprising a piece of cardboard, edging strips on the ends thereof, comprising an end portion connected with top and bottom sections, another section secured upon one of said sections along its entire area, and another portion connected upon said section and arranged adjacent said end portion forming a passage therebetween, and inturned flaps upon the ends of said end portion and adjacent end portion to facilitate the insertion of a strip within said passage, said inner end portion being further reinforced by another section extended adjacent it, said latter mentioned section being formed by bending up an edge of said inner end portions.

KENNETH W. STROHOFER.